UNITED STATES PATENT OFFICE.

HEINRICH HELBING AND FRANCIS WILLIAM PASSMORE, OF LONDON, ENGLAND.

THICKENING OR SOLIDIFYING MINERAL OILS.

SPECIFICATION forming part of Letters Patent No. 666,010, dated January 15, 1901.

Application filed June 25, 1900. Serial No. 21,434. (No specimens.)

*To all whom it may concern:*

Be it known that we, HEINRICH HELBING and FRANCIS WILLIAM PASSMORE, consulting chemists, of 63 Queen Victoria street, London, England, have invented certain new and useful Improvements in the Thickening or Solidification of Mineral Oils, of which the following is a specification.

The present invention relates to improvements in the thickening or solidification of liquid petroleum-oils, paraffin, and the like.

For many purposes the conversion of the liquid portion of petroleum-oils into a solid mass is a most desirable object and has hitherto been effected by the addition of absorbent materials like sawdust or by the incorporation with the oil of solid substances, such as resin or soap or coal-dust, or by a combination of all methods. In all these cases a relatively large quantity of material must be added to produce the desired effect, and this renders the product useless or too costly for many purposes to which a solidified petroleum could otherwise be put.

According to our invention we convert liquid petroleum into a thickened or solid mass by mixing it with a concentrated aqueous solution of a salt of casein, preferably the sodium salt. The amount of casein salt necessary to bring about this transformation is relatively very small, and consequently the resulting product can be put to uses to which so-called "solidified" petroleums as hitherto made could not be applied.

In some cases we may add formic aldehyde to the thickened or solidified product in order to obtain a more permanent and complete solidification, the effect of the formic aldehyde being to render the solidified petroleum harder.

It will be understood that we do not limit ourselves to any particular proportions of ingredients.

By way of example we may add to twenty parts of casein one hundred parts of decinormal caustic-soda solution or a sufficiency to obtain a substantially neutral solution thereof, applying heat cautiously for dissolving. To the stiff gelatinous solution are added at first drop by drop and subsequently more rapidly with constant stirring in an emulsion-mortar or by suitable mechanical means one thousand parts of petroleum. It will be found necessary to add during the incorporation of the petroleum, according to the character of the petroleum-oil used, from time to time a small quantity of water to obtain complete emulsification. Generally the addition of about five parts of water to one hundred parts of petroleum is required. The emulsion is then poured into suitable molds and allowed to stand, whereupon it gradually thickens.

In order to obtain a more permanent and complete solidification and more rapid hardening, there are added to every one thousand parts of the freshly-made emulsion ten parts of ordinary commercial forty-per-cent. formaldehyde solution, care being taken that the formaldehyde is added rapidly and uniformly incorporated. The product thus treated with formic aldehyde is likewise at once turned into molds and left to harden.

The relative proportions of the ingredients may, as above mentioned, vary according to the particular kind of product which it is desired to obtain.

What we claim, and desire to secure by Letters Patent, is—

1. The process of thickening, or solidifying, a petroleum-oil, which consists in treating the same with casein, held in aqueous solution by a solvent.

2. The process of thickening, or solidifying a petroleum-oil which consists in treating the same with an aqueous solution of an alkaline salt of casein.

3. The process of thickening or solidifying a petroleum-oil which consists in treating the same with an aqueous solution of a sodium salt of casein.

4. A composition of matter consisting of a petroleum thickened, or solidified, by casein, held in solution by a solvent.

5. A composition of matter, consisting of a petroleum, thickened, or solidified by an aqueous solution of an alkaline salt of casein.

6. A composition of matter consisting of a petroleum, thickened, or solidified, by an aqueous solution of a sodium salt of casein.

7. The method or process of thickening or solidifying a petroleum-oil, which consists in first treating the same with a salt of casein in aqueous solution and then hardening the same by means of formic aldehyde.

8. The method or process of thickening or solidifying a petroleum-oil which consists in treating the same with sodium salt of casein in aqueous solution and then hardening by means of formic aldehyde.

9. As a new product a caseinated formaldehyded petroleum, being a body insoluble in water, and having no melting-point, but from which petroleum may be extracted by distillation and having a color similar to the color of the petroleum used in its production but less transparent.

In witness whereof we have hereunto signed our names in the presence of two subscribing witnesses.

HEINRICH HELBING.
FRANCIS WILLIAM PASSMORE.

Witnesses:
 THOMAS L. WHITEHEAD,
 ROBERT M. SPEARPOINT.